United States Patent
Campos et al.

(10) Patent No.: US 11,451,020 B2
(45) Date of Patent: Sep. 20, 2022

(54) CORE EXTRACTION ASSESSMENT

(71) Applicant: Cable Television Laboratories, Inc., Louisville, CO (US)

(72) Inventors: Luis Alberto Campos, Superior, CO (US); Thomas Holtzman Williams, Longmont, CO (US); Zhensheng Jia, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 595 days.

(21) Appl. No.: 16/252,233

(22) Filed: Jan. 18, 2019

(65) Prior Publication Data

US 2019/0222007 A1 Jul. 18, 2019

Related U.S. Application Data

(60) Provisional application No. 62/658,086, filed on Apr. 16, 2018, provisional application No. 62/648,269, (Continued)

(51) Int. Cl.
*H02G 1/16* (2006.01)
*H01R 24/56* (2011.01)
(Continued)

(52) U.S. Cl.
CPC ............ *H02G 1/16* (2013.01); *G02B 6/50* (2013.01); *H01R 24/566* (2013.01); *H02G 1/08* (2013.01); *H02G 1/086* (2013.01); *H02G 1/12* (2013.01); *H02G 1/1273* (2013.01); *H04H 60/93* (2013.01); *H04L 12/2801* (2013.01)

(58) Field of Classification Search
CPC .......... H02G 1/12; H02G 1/1273; H02G 1/16; H02G 1/086; G02B 6/50; G02B 6/52; G02B 6/4485
See application file for complete search history.

(56) References Cited

U.S. PATENT DOCUMENTS

| 5,483,169 A * | 1/1996 | Despain | G01R 27/04 |
| | | | 324/533 |
| 5,990,687 A * | 11/1999 | Williams | G01R 31/58 |
| | | | 324/529 |

(Continued)

OTHER PUBLICATIONS

Deep Fiber Solutions ("Services—Deep Fiber Solutions"; deepfibersolutions.com/services/; published Oct. 7, 2014; and associated Youtube video: https:www.youtube.com/watch?v=oQJUSGLCi0M); hereinafter "Deep Fiber Solutions"); copy previously mailed to Applicant (May 7, 2021).*

*Primary Examiner* — Jeffrey T Carley
(74) *Attorney, Agent, or Firm* — Great Lakes Intellectual Property, PLLC (57) ABSTRACT

Generating an assessment of the suitability of cables, ducts, tubes, pipes and/or other hollow-type of conduits to extraction of cores, conductors, insulation, etc. included therein while still buried in the ground or otherwise positioned out-of-sight so as to be unavailable for visual and/or physical inspection is contemplated. The assessment may be used to indicate a suitability of a cable buried in the ground of a hybrid fiber coaxial (HFC) cable plant to extraction of the type whereby a core of the cable may be extracted using hydraulics while still buried.

20 Claims, 5 Drawing Sheets

Related U.S. Application Data filed on Mar. 26, 2018, provisional application No. 62/642,905, filed on Mar. 14, 2018, provisional application No. 62/642,937, filed on Mar. 14, 2018, provisional application No. 62/618,731, filed on Jan. 18, 2018.

(51) Int. Cl.
*H04L 12/28* (2006.01)
*H04H 60/93* (2008.01)
*H02G 1/08* (2006.01)
*G02B 6/50* (2006.01)
*H02G 1/12* (2006.01)

(56) References Cited

U.S. PATENT DOCUMENTS

| | | | |
|---|---|---|---|
| 8,037,599 B2 * | 10/2011 | Pichler | H02G 1/14 29/870 |
| 2004/0245995 A1 * | 12/2004 | Williams | H04N 17/00 324/512 |
| 2012/0306510 A1 * | 12/2012 | White | G01R 31/1272 324/551 |
| 2013/0082866 A1 * | 4/2013 | Jaganathan | G01S 13/885 342/22 |
| 2017/0110808 A1 | 4/2017 | Purdy | |
| 2020/0295545 A1 * | 9/2020 | Bertini | H02G 1/16 |

* cited by examiner

CORE EXTRACTION ASSESSMENT

CROSS-REFERENCE TO RELATED APPLICATIONS

This application claims the benefit of U.S. provisional application Nos. 62/618,731, filed Jan. 18, 2018; 62/642,937, filed Mar. 14, 2018; 62/642,905, filed Mar. 14, 2018; 62/648,269, filed Mar. 26, 2018; and 62/658,086, filed Apr. 16, 2018, the disclosures of which are incorporated in their entireties by reference herein.

TECHNICAL FIELD

The present invention relates to assessing suitability of cables, ducts, tubes, pipes and/or other hollow-type of conduits to extraction of cores, conductors, insulation, etc. included therein while still buried in the ground, or aerial, or otherwise positioned out-of-sight so as to be unavailable for visual and/or physical inspection, such as but not necessarily limited to generating an assessment sufficient for indicating a suitability of a cable buried in the ground of a hybrid fiber coaxial (HFC) cable plant to extraction of the type whereby a core of the cable may be extracted using hydraulics while still buried or strung.

BACKGROUND

Hybrid fiber coaxial (HFC) networks, cable networks and other communication networks may utilize a combination of fiber and non-fiber communication mediums. More and more of those networks may be evolving to penetrate fiber deeper and/or to enable more of the related signaling to be optically carried through fiber as opposed to non-optically carried through copper or other wired conductors. Some fiber may currently be reaching serving areas of 500 household passed (HHP) but could soon reach 64 HHP as service providers migrate to Node+0 architectures and the like in an attempt to push fiber closer to subscribers.

A new fiber may be buried, trenched or otherwise concealed within the ground to conduct signaling between nodes, pedestals or other access points for subscriber connection. The process for laying new fiber can be a relatively expensive for the service provider if required to correspondingly dig new trenches, obtain permits and otherwise undertake the physical activities needed to newly bury the fiber. Another solution for adding new fiber can include blowing or pushing the fiber through an existing infrastructure already buried in the ground or otherwise deployed in the network, such as through a cable or another type of conduit already being used to facilitate signaling through a wired conductor or for another purpose. One such process includes hydraulically extracting a core of a coaxial cable whereafter new fiber can be blown through an outer shield of the cable left in the ground following the core extraction. The core extraction process ameliorates the expenses incurred in running the new fiber by effectively eliminating the expensive steps otherwise needed to physically bury an outer shield or other structure needed to concealed the fiber within the ground.

Removing the core, e.g., conductor and dielectric of a coaxial cable, to obtain a metallic conduit may rely on the hydraulic injection at high pressure of a lubricating liquid or soap between the outer shield and the core. Areas where a coaxial cable has particularly suffered the most damage through aging, environment and handling may be areas where decisions to replace coaxial cable with fiber optic cable has likely been made. The coaxial cable that has worn may sometimes have kinks, cracks, corrosion and other problems that can make it unsuitable to reuse, i.e., its integrity, shape, etc. may be unsuitable to the hydraulic extraction process. It can be costly and challenging to troubleshoot and/or fix issues with the infrastructure to be re-used once the hydraulic process extraction process has begun and difficult to identify unsuitability prior to commencing hydraulic extraction due to the infrastructure being buried in the ground or otherwise out-of-sight so as to be unavailable for visual and/or physical inspection, at least without undertaking significant time and expense in uncovering it.

One non-limiting aspect of the present invention contemplates assessing the suitability of a cable or other conduit-type of infrastructure to identify problems before commencing extraction, such as by leveraging proactive network maintenance techniques and/or other metrically based analysis capabilities to locate and identify kinks, cracks and other problems with an integrity of the cable that could affect its suitability in being re-used as a fiber conduit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
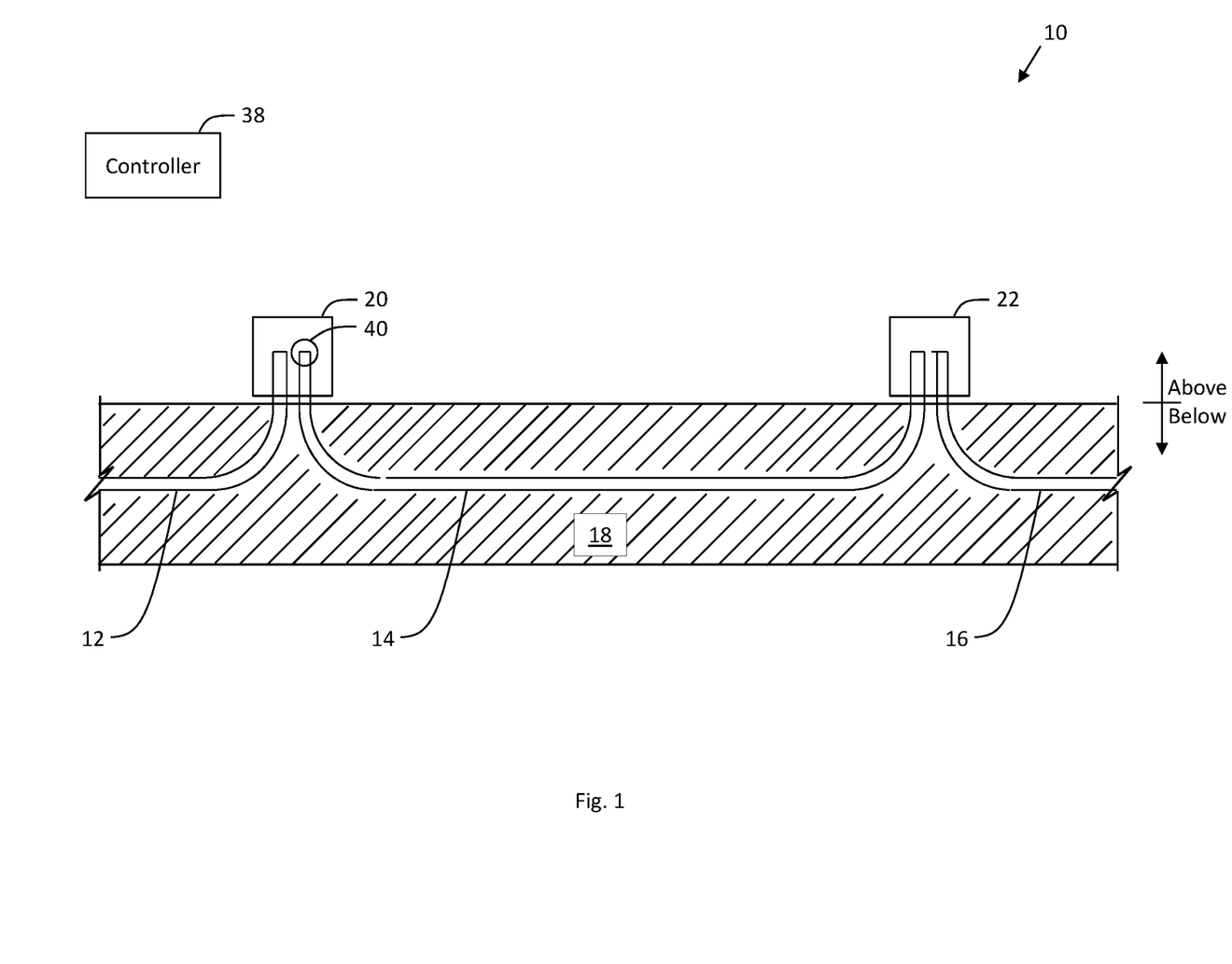
FIG. 1 illustrates an infrastructure of a communication system in accordance with one non-limiting aspect of the present invention.

FIG. 1 illustrates an infrastructure 10 of a communication system in accordance with one non-limiting aspect of the present invention. The infrastructure 10 may be associated with a hybrid fiber coaxial (HFC) cable network or any other network relying at least partially on signaling carried over communication lines 12, 14, 16. The infrastructure 10 is shown for exemplary purposes with respect to a portion of such a network including communication lines 12, 14, 16 buried in the ground 18 to facilitate signaling between pedestals, nodes access points or other connections, relays, etc. 20, 22. The pedestals or other interconnections 20, 22 between the communication lines 12, 14, 16 may include additional componentry (not shown) to facilitate relaying signaling between adjoining communication lines 12, 14, 16, other components, subscribers, etc. The pedestals 20, 22 are illustrated for exemplary purposes as being above ground features sufficient for accessing ends of the communication lines as the present invention fully contemplates the pedestals 20, 22 being recessed in the ground or otherwise configured to permit accessing the ends of the communication lines 12, 14, 16, including access to the ends without the ends having to protrude above the ground. The communication lines 12, 14, 16 are predominately described with respect to being buried within the ground 18 for exemplary non-limiting purposes as the present invention fully contemplates its use and application with communication lines 12, 14, 16 above ground when out-of-sight or otherwise unavailable for visual and/or physical or electronic inspection, e.g., communication lines embedded within other materials or structures.

Figure 2:
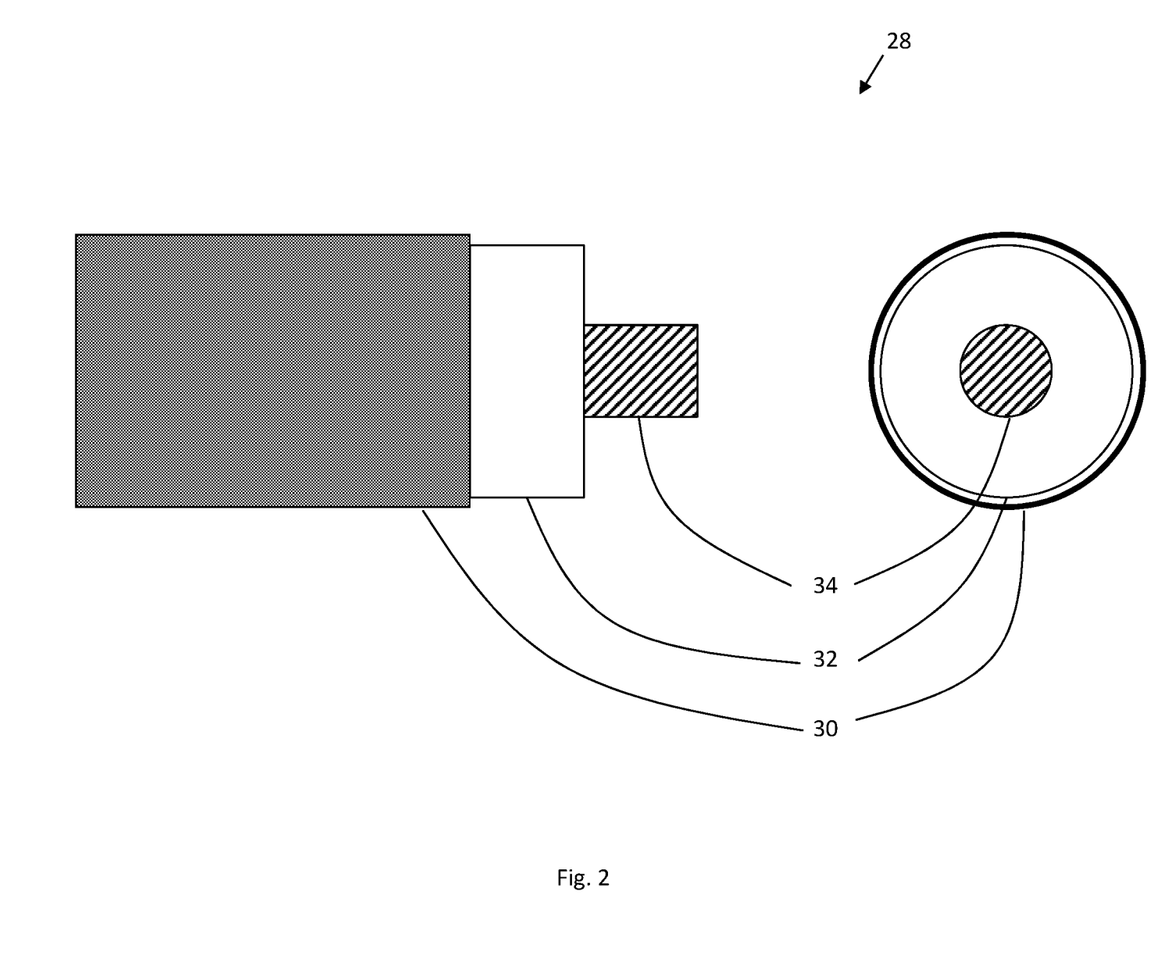
FIG. 2 illustrates a communication line in accordance with one non-limiting aspect of the present invention.

FIG. 2 illustrates a communication line 28 in accordance with one non-limiting aspect of the present invention. The communication line 28 is shown to be configured as a cable of the type commonly employed within cable plants and other networks relying on wired-mediums for communication, and frequently referred to as a coaxial cable. The cable 28 may include an outer shield 30, a dielectric 32 and a conductor 34 whereby the dielectric 32 and the conductor 34 may be characterized as a core of the cable 28 being protected with the outer shield 30. The outer shield 30 may be an aluminum shield or other material of sufficient rigidity or integrity to protect the core and/or the signaling carried therethrough. The dielectric 32 may be a polyethylene foam or other material sufficient for insulating the conductor 34. The conductor 34 may be a copper-clad aluminum conductor or other material sufficient for signal conduction. The cable may include adhesives or other binding agents and/or other features and is shown for exemplary non-limiting purposes to be circular in accordance with the coaxial-type of cable typically employed within cable plants as the present invention fully contemplates the cable 28 or other type of communication line having other shapes and configurations.

The cable 28 may be sufficient for a re-use process whereby a fluid may be injected into one end while the cable 28 is buried to force the core out the other end whereafter a fiber or other communication medium may be pushed or blown through the outer shield 30 left in the ground. The present invention predominately describes its use and application in facilitating replacement of cables with fibers using hydraulic extraction for exemplary non-limiting purposes as the use of non-hydraulic extraction processes and insertion of non-fiber elements is fully contemplated. The replacement of cable with fibers is presented to demonstrate problems in facilitating hydraulic extraction for structures buried in the ground, particularly with respect to assessing the suitability of the cable 28 or other conduit-type of infrastructure left behind after extraction. One non-limiting aspect of the present invention contemplates improving the process of replacing existing cables with fibers by leveraging proactive network maintenance techniques and/or other metrically based analysis capabilities to locate and identify kinks, cracks and other problems with an integrity of the cable 28 (e.g., the outer shield 30) affecting its suitability in being re-used as a fiber conduit before undertaking the extraction process.

The hydraulic extraction process may rely upon the injected fluid achieving a pressure sufficient for compressing the dielectric 32 or otherwise breaking it free from the outer shield 30 so that it can be pushed out an opposite end. This process may require an integrity of the outer shield 30 be sufficient for maintaining the fluid at a pressure above a threshold needed for compressing the dielectric 32, e.g., compressing the dielectric to 95% of its original size, and pushing the core out the other end, which may be proportional to its length. In addition to maintaining a sufficient pressure, the outer shield 30 may also need to be sufficiently shaped to permit extraction of the core, e.g., devoid of bends or angles inhibiting hydraulic extraction of the core. It can be challenging to assess these and other physical characteristics of the cable 28 while still buried, such as when attempting to determine whether there are any corrosion spots, cracks, kinks, bends or other problems that could make it unsuitable for the hydraulic extraction process. The cable 28 may be considered to be unsuitable for the hydraulic extraction of its core if any of the physical characteristics produce fluid leakage or other pressurization issues preventing the core from being sufficiently compressed or freed for extraction and/or if any of the physical characteristics indicate obstacles, obstructions or other shape-based impediments to extraction of the core.

One non-limiting aspect of the present invention contemplates assessing the suitability of the cable 28 for hydraulic extraction of its core when buried and while the cable 28 is operating as part of a fully functional RF network or otherwise communicating signals thereover. The contemplated assessment may include scanning the cable 28 for leakages using high accuracy leakage detection devices, such using synthetic aperture antenna systems, and correlating corresponding RF leakage with network topology using a controller 38 or other tool to indicate a location of potential cracks, discontinuities corrosion, bends and other physical characteristics of the outer shield affecting its suitability in facilitating extraction of the court. The assessment may include distinguishing leakage occurring at the ends of the cable 28, such as from a loose connection or a problem at a passive or active device that is unlikely to affect its suitability for core extraction, from leakage occurring midspan or at some other location between the ends that is more likely to affect core extraction. The leakage problems midspan or otherwise identified as impacting the integrity of the outer conductor 30 may be marked so that the problem can be resolved before blowing fiber through, e.g., a point where the problem was found can be fixed to establish conduit integrity or become either a new endpoint for core extraction.

Some problems, such a sharp bend, a kink, a corroded segment, may not exhibit leakage but can indicate that the integrity of the outer shield 30 has been damaged. These problems can be analyzed using equalization coefficients to assess whether an impedance discontinuity has been detected at the impairment location and/or the coefficients can also indicate whether the impairment is located at the end of the cable 28 or if it is a midspan problem. For greater accuracy, multiple channels or the entire spectrum can be used in the analysis, optionally with a normalization process to avoid attenuation of long lengths of coax masking the severity of mid-span micro-reflections. Testing for common path distortion (CPD) can additionally be used to facilitate identifying corrosion related problems as some corresponding issues may be challenging to discover using only pre-equalization techniques. A finer localization of physical problems of the cable affecting core extraction can be performed using time domain reflection (TDR) techniques and/or other similar techniques, such as that disclosed in U.S. Pat. No. 9,871,557, entitled Radio Frequency Leakage Detection In A Cable Plant, the disclosure of which is hereby incorporated by reference in its entirety. In addition to wireless sensors included on the controller 38, a probe 40 can be inserted into a test port of an amplifier or an unused K-connector port of the tap/pedestal 20 to facilitate assessing signaling characteristics of the cable.

One non-limiting aspect of the present invention contemplates utilizing the controller 38 to facilitate assessing signaling characteristics of the cable 28 and identifying/displaying locations of the cable 28 having integrity challenges affecting its suitability for core extraction. The controller 28 may facilitate assessing the signaling characteristics, such as by measuring leakage and other characteristics associated with the cable 28, either directly or indirectly through measurement devices physically connected thereto (e.g., probe 40), and/or in communication therewith, such as in response to metrics and other signaling assessments made by other devices in communication with the cable 28 capable of generating empirical data regarding its signaling characteristics. The controller 38 may then correlate the signaling characteristics to physical characteristics of the cable 28 associated with identifying its suitability for core extraction. A number of physical characteristics may affect suitability of the cable 28 for core extraction, which may be characterized as any physical characteristic affecting an ability of the cable 28 to maintain hydraulic pressure at a sufficient threshold needed to facilitate core extraction and structural integrity needed to assure the core can be pushed out one and of the cable in response to fluid insertion at the other end.

Figure 3:
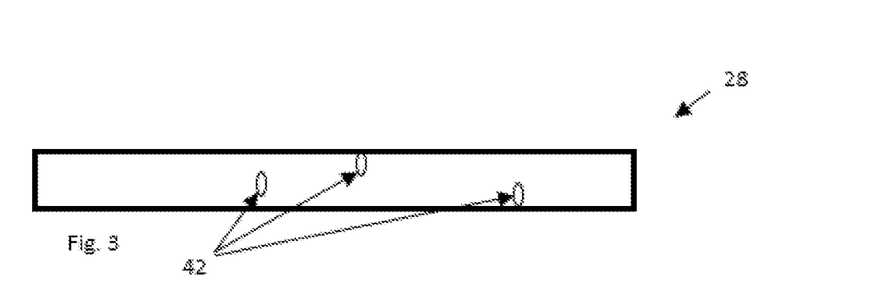
FIGS. 3-5 illustrate a plurality of physical characteristics for the cable in accordance with one non-limiting aspect of the present invention.
Figure 4:
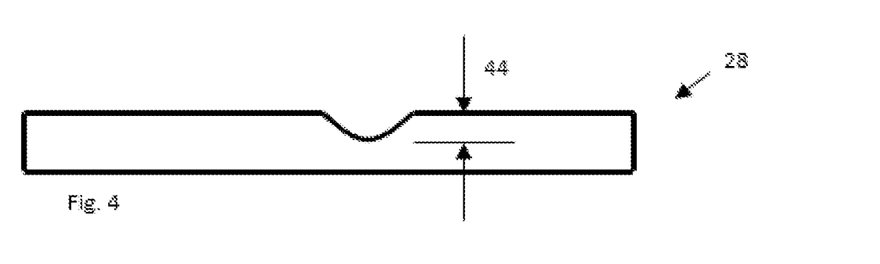
Figure 5:
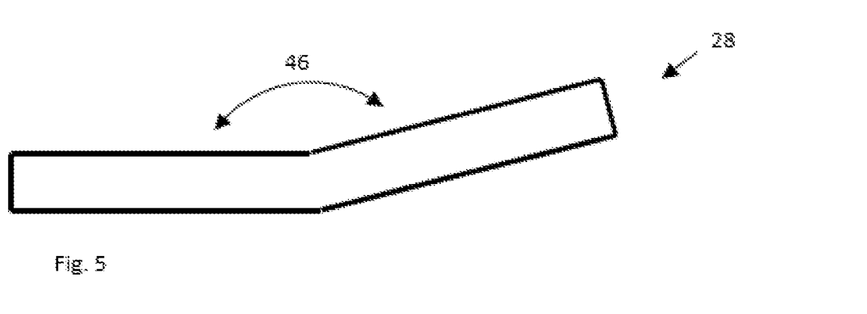

FIGS. 3-5 illustrate a plurality of physical characteristics 42, 44, 46 for the cable 28 in accordance with one non-limiting aspect of the present invention. The physical characteristics 42, 44, 46 may be those derived from the signaling characteristics to represent suitability of the cable 28 to core extraction. An integrity characteristic 42 may be derived to represent corrosion or other structural impairments affecting core extraction, such as whether corrosion, cracks or other sources of fluid leakage may be present to a degree sufficient to prevent the outer shell 30 from maintaining the hydraulic pressure needed for core extraction. A circularity or smoothness characteristic 44 may be derived to indicate whether dents or other structural deviations have narrowed or affected a cross-sectional area to create an impediment to the core passing therethrough in response to hydraulic pressure. An angularity characteristic 46 may be derived to represent bends or other directional influences sufficient to thwart the core passing therethrough in response to hydraulic pressure. The integrity, circularity, angularity or other physical characteristics derived from the signaling characteristics may be related to corresponding thresholds to make an assessment as to whether the cable 28 is suitable or unsuitable for core extraction, which may be adjusted to compensate for a length of the cable and/or size, shape and material of its components.

Figure 6:
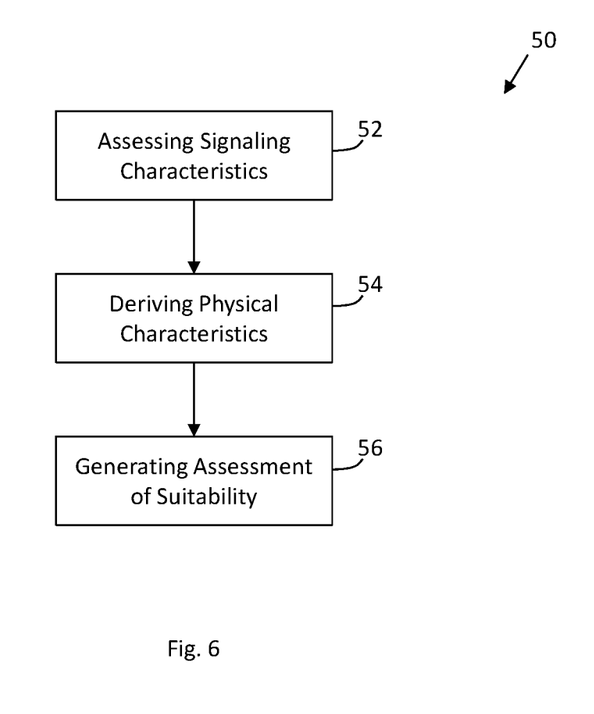
FIG. 6 illustrates a flowchart of a method for assessing suitability of a communication line for core extraction in accordance with one non-limiting aspect of the present invention.

FIG. 6 illustrates a flowchart 50 of a method for assessing suitability of a communication line for core extraction in accordance with one non-limiting aspect of the present invention. The method may relate to making an assessment sufficient for indicating a suitability or an unsuitability of a communication line included with a network or other infrastructure to having a core extracted while the communication line is buried in the ground, embedded in a structure or other material, or otherwise positioned out-of-sight so as to be unavailable for visual and/or physical inspection. The assessment may be facilitated with a processor of a controller, such as a mobile controller held by a technician in the field, executing a plurality of instructions stored on a non-transitory computer-readable medium associated therewith. The core extraction is predominant described with respect to the communication line being a coaxial cable and its core being extracting using hydraulics for exemplary non-limiting purposes as the present invention fully contemplates making similar assessments for pneumatic or other non-hydraulic processes and/or for extracting non-coaxial or non-circular cores from non-metallic outer shields capable of leaving a sufficient structure after the core extraction to permit blowing or pushing fiber or other material therethrough.

Operation 52 relates to determining signaling characteristics for the communication line desired for core extraction. The signaling characteristics may be determined directly with wireless and/or wired signaling detected with the controller and/or indirectly with the controller as a function of wireless and/or wired signaling detected with testing components or other measurement devices connected to the communication line or otherwise included within the cable plant or other network having the communication line. The signaling characteristics may be determined by passively monitoring normal operation of the communication line, such as in response to a technician in the field instigating a signal collection process using the controller while subscribers or other entities relying on the communication line are conducting regular activities. The signaling characters may also be determined by intentionally controlling signaling or otherwise inducing signaling over the communication line, such as in response to the controller issuing test signals to the communication line to measure a corresponding response, such as through signaling emitted therefrom and/or signaling instructed to be sent over the communication line from other devices connected thereto. The signaling characteristics may be derived under both circumstances from signaling carried over the communication line while buried in the ground to facilitate making the assessment prior to commencing extraction.

Operation 54 relates to deriving physical characteristics for the communication line desired for core extraction. The physical characteristics may be used to represent structure, integrity, angularity, circularity or other physical characteristics of an outer shield other portion of the communication line intended to remain buried in the ground following core extraction. The physical characteristics may be derived from the signaling characteristics and/or through other mechanisms, e.g., the length, shape, diameter or some of the other physically characteristics of the communication line may be measurable at a pedestal or other exposure point(s) above ground and/or based on characteristics previously stored in a database when the communication line was initially buried. One non-limiting aspect of the present invention particularly contemplates having an incomplete or an inconclusive understanding of the physical characteristics due to a complete assessment being challenging to perform while the communication line is buried such that the physical characteristics derived from the signaling characteristics may be more conclusive and/or used to augment suppositions or other estimates as to the structure of the communication line.

One non-limiting aspect of the present invention contemplates the signaling characteristics measured in Operation 52 including values sufficient for representing leakage, common path distortion (CPD), harmonics and/or reflections or microreflections whereby the controller then processes those values to generate the physical characteristics, i.e., values for integrity, angularity, circularity, etc. The leakage values can be used to identify locations where damage to the outer shield of the communication line causes RF signals to leak into the environment, e.g., the material characteristics of the outer shield may otherwise prevent RF leakage except where cracks or other damage has created openings or degraded integrity. The ability to find cracks or other openings in the outer shield may be beneficial in assessing whether the outer shield can maintain the hydraulic pressure needed to facilitate extraction. The CPD and harmonics values can be used to assess corrosion or other degradations associated with dissimilar metals corroding materials affecting structural integrity of the outer shield with respect to maintaining the hydraulic pressure. The microreflection values may be used to test impedance of the coaxial transmission line for deviations from the nominal impedance. Such deviations may even include extreme cases such as open and/or closed circuit-conditions over the communication line.

Operation 56 relates to generating an assessment as to a suitability or an unsuitability of the communication line for core extraction. The assessment may be based on whether the physical characteristics derived from the signaling characteristics and/or other measured variables indicate a probability of the outer shield being capable of maintaining hydraulic pressure necessary for core compression or separation and having a shape or structure throughout sufficient to enable pushing hydraulically pushing the core therethrough. The assessment may be based on comparing the signaling characteristics to threshold values sufficient for relating the signaling characteristics to the physical characteristics, i.e., equating values of the signaling characteristics to thresholds sufficient for indicating whether the corresponding physical characteristics indicate suitability or unsuitability for core extraction. The leakage value may be related to a threshold whereby the threshold may be set to permit some cracks or other integrity issues as long as insufficient to prevent core extraction. The harmonics in such work CPD values may be similarly related to thresholds such as some level of corrosion may be permitted as long as insufficient to prevent core extraction. The reflection values may be related to open/closed circuit thresholds, optionally in the case of an open circuit, additional analysis to determine whether the open condition affects the outer shield or is limited to the conductor, e.g., a test signal can be applied to the outer shield if capable of conducting.

A PNM processes may be used in generating the assessment to enable the estimation of metrics describing of coaxial cable at different frequencies including the cable's impedance characteristics. A first order approximation of the coaxial line impedance can be given by $Z_o=(138/SQRT(e))*\log_{10}(D/d)$ where e is the permittivity of the dielectric, D is the inner diameter of the outer conductor and d is the outer diameter of the inner conductor. A more accurate representation of the impedance varies with frequency. When the coaxial cable deviates in shape from circular shape the d and D values change as the cable becomes more elliptical, this result in a change in impedance. A more drastic change in shape results in a greater change in impedance and when it reaches a severe level, it could even prevent the hydraulic core removal process to indicate an unsuitability. It may also result in a weak structure that may not withstand the core removal process.

Figure 7:
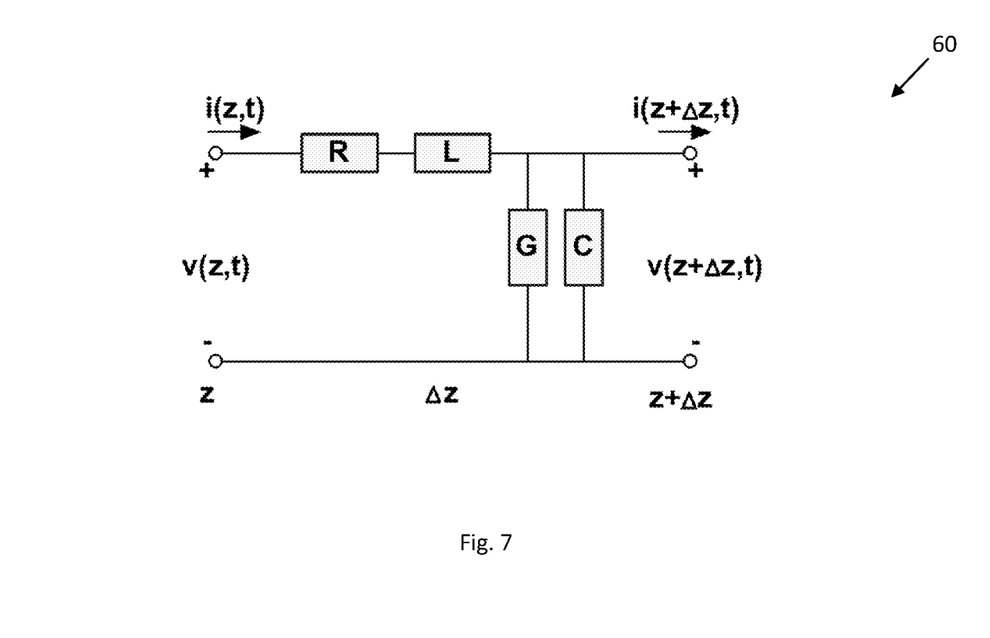
FIG. 7 illustrates an equivalent circuit for making an assessment of suitable in accordance with one non-limiting aspect of the present.

FIG. 7 illustrates an equivalent circuit 60 for making an assessment of suitable in accordance with one non-limiting aspect of the present. The equivalent circuit 60 may be used to represent a coaxial transmission line for a differential length of cable where R is a resistance per length, L is inductance per length, G is conductance per length and C is capacitance per length. When there is an abnormality in the coaxial cable this model changes for a differential length of cable. Adding corrosion in the coaxial cable can be represented by adding a diode to the model, having a radial crack can be described by adding capacitance between two consecutive differential lengths of coaxial cable. An example threshold value to decide on fixing the coaxial transmission line prior to blowing through the center conductor, i.e., unsuitability, could be when the magnitude of the impedance changes greater than +/-3 dB. Another example threshold value to decide on fixing the coaxial transmission line can be when the leakage is detected in midspan cable locations, i.e., locations where no connectors are located and damaged in the integrity of the coaxial cable can be inferred.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assessing suitability of a cable buried in the ground to a hydraulic extraction of the type whereby a core of the cable is extracted using hydraulics, the method comprising:
   electronically measuring signaling characteristics for signaling communicated through the cable while buried;
   processing the signaling characteristics to generate an assessment, the assessment representing suitability of the cable for the hydraulic extraction; and
   indicating with the assessment the cable being one of suitable and unsuitable for the hydraulic extraction depending on physical characteristics of the cable derived from the signaling characteristics, including indicating the cable as suitable when the physical characteristics indicate an angularity measured between a first portion and a second portion of an outer shield surrounding the core exceeds an angularity threshold and indicating the cable as unsuitable when the angularity is below the angularity threshold.

2. The method of claim 1 further comprising indicating the cable as unsuitable when the physical characteristics indicate an integrity of an outer shield surrounding the core being insufficient to maintain a hydraulic pressure above a hydraulic threshold.

3. A method for assessing suitability of a cable buried in the ground to a hydraulic extraction of the type whereby a core of the cable is extracted using hydraulics, the method comprising:
   electronically measuring signaling characteristics for signaling communicated through the cable while buried;
   processing the signaling characteristics to generate an assessment, the assessment representing suitability of the cable for the hydraulic extraction; and
   indicating with the assessment the cable being one of suitable and unsuitable for the hydraulic extraction depending on physical characteristics of the cable derived from the signaling characteristics, including indicating the cable as suitable when the physical characteristics indicate a circularity continuously measured between a first portion and a second potion of an outer shield surrounding the core exceeds a circularity threshold and indicating the cable as unsuitable when the circularity is below the circularity threshold.

4. The method of claim 1 further comprising indicating with the assessment the cable being unsuitable for the hydraulic extraction when the signaling characteristics indicate a radio frequency (RF) leakage exceeds a radio threshold.

5. The method of claim 1 further comprising indicating with the assessment the cable being unsuitable for the hydraulic extraction when the signaling characteristics indicate microreflections exceed a microreflections threshold.

6. The method of claim 1 further comprising indicating with the assessment the cable being unsuitable for the hydraulic extraction when the signaling characteristics indicate harmonics exceed a harmonics threshold.

7. The method of claim 1 further comprising indicating with the assessment the cable being unsuitable for the hydraulic extraction when the signaling characteristics indicate common path distortion (CPD) exceeds a CPD threshold.

8. A method for assessing suitability of a cable buried in the ground to a hydraulic extraction of the type whereby a core of the cable is extracted using hydraulics, the method comprising:
   electronically measuring signaling characteristics for signaling communicated through the cable while buried;
   processing the signaling characteristics to generate an assessment, the assessment representing suitability of the cable for the hydraulic extraction; and
   indicating with the assessment the cable being one of suitable and unsuitable for the hydraulic extraction depending on physical characteristics of the cable derived from the signaling characteristics indicating one or more leakages within the cable, including indicating each leakage to be midspan or endspan, the assessment indicating:
   i) the cable to be suitable for the extraction when each leakage is designated as endspan;
   ii) the cable to be suitable for the extraction when each leakage designated as midspan meets a threshold assigned thereto; and
   iii) the cable to be unsuitable for the extraction when at least one leakage designated as midspan fails to meet the threshold assigned thereto.

9. The method of claim 8 further comprising determining one or more of the leakages based on a hydraulic pressure characteristic, the hydraulic pressure characteristic representing hydraulic pressure needed for the core extraction.

10. The method of claim 8 further comprising determining one or more of the leakages based on a diameter of the core, a length of the cable and an amount of force needed to compress or free the core.

11. The method of claim 8 further comprising determining one or more of the leakages based on an integrity characteristic.

12. The method of claim 8 further comprising determining one or more of the leakages based on an impediment characteristic, the impediment characteristic representing circularity, angularity or smoothness within the cable.

13. The method of claim 8 further comprising a controller processing the signaling characteristics to determine the cable to be suitable or unsuitable for the core extraction, the controller determining the signaling characteristics from measurements made by a probe, the probe being connected to the cable in a passive manner such that the measurements are generated without disrupting the cable while being used in normal operation to transport signals.

14. The method of claim 8 further comprising determining each leakage with a controller based on the controller measuring and processing the signal characteristics of the cable.

15. The method of claim 1 further comprising a controller processing the signaling characteristics to determine the cable to be suitable or unsuitable, the controller determining the signaling characteristics from measurements made by a probe, the probe being connected to the cable in a passive manner such that the measurements are generated without disrupting the cable while being used in normal operation to transport signals.

16. The method of claim 1 further comprising indicating with the assessment the cable being unsuitable when the signaling characteristics indicate a leakage designated as midspan failing to meet a midspan threshold.

17. The method of claim 3 further comprising a controller processing the signaling characteristics to determine the cable to be suitable or unsuitable, the controller determining the signaling characteristics from measurements made by a probe, the probe being connected to the cable in a passive manner such that the measurements are generated without disrupting the cable while being used in normal operation to transport signals.

18. The method of claim 3 further comprising indicating with the assessment the cable being unsuitable when the signaling characteristics indicate a leakage designated as midspan failing to meet a midspan threshold.

19. The method of claim 3 further comprising indicating with the assessment the cable being unsuitable when the signaling characteristics indicate:
   integrity of an outer shield surrounding the core being insufficient to maintain a hydraulic pressure above a hydraulic threshold;
   radio frequency (RF) leakage exceeds a radio threshold;
   microreflections exceed a microreflections threshold;
   harmonics exceed a harmonics threshold; or
   common path distortion (CPD) exceeds a CPD threshold.

20. The method of claim 8 further comprising indicating with the assessment the cable being unsuitable when the signaling characteristics indicate:
   integrity of an outer shield surrounding the core being insufficient to maintain a hydraulic pressure above a hydraulic threshold;
   radio frequency (RF) leakage exceeds a radio threshold;
   microreflections exceed a microreflections threshold;
   harmonics exceed a harmonics threshold; or
   common path distortion (CPD) exceeds a CPD threshold.

* * * * *